US007514569B2

(12) United States Patent
Hosaka

(10) Patent No.: US 7,514,569 B2
(45) Date of Patent: Apr. 7, 2009

(54) BENZIMIDAZOLONE COMPOUND

(75) Inventor: Masaki Hosaka, Sakura (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 513 days.

(21) Appl. No.: 10/578,677

(22) PCT Filed: Dec. 7, 2004

(86) PCT No.: PCT/JP2004/018190

§ 371 (c)(1),
(2), (4) Date: May 9, 2006

(87) PCT Pub. No.: WO2005/056688

PCT Pub. Date: Jun. 23, 2005

(65) Prior Publication Data

US 2007/0135639 A1  Jun. 14, 2007

(30) Foreign Application Priority Data

Dec. 9, 2003 (JP) .................... P2003-410204

(51) Int. Cl.
*C07D 235/04* (2006.01)
*C07D 403/12* (2006.01)
(52) U.S. Cl. ............ 548/305.4; 548/301.7; 548/302.7; 548/304.4; 548/305.1
(58) Field of Classification Search ............ 548/300.1, 548/301.7, 304.4, 305.1, 305.4
See application file for complete search history.

(56) References Cited

FOREIGN PATENT DOCUMENTS

EP  1 447 430 A1  8/2004

JP  9-143387  6/1997

OTHER PUBLICATIONS

H. Gaertner; "Modern Chemistry of Organic Pigments;" *J. Oil & Color Chemists Assoc.*; vol. 46; No. 13; Jan. 1963, pp. 13-46 (18 Sheets total.)/Discussed in the specification.

*Primary Examiner*—Golam M Shameem
(74) *Attorney, Agent, or Firm*—Edwards Angell Palmer & Dodge LLP

(57) ABSTRACT

A benzimidazolone compound represented by a general formula (1),

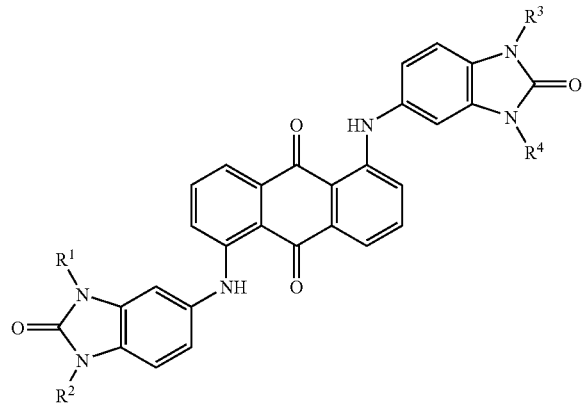

(in the formula, each of $R^1$, $R^2$, $R^3$ and $R^4$ represents independently a hydrogen atom, an alkyl group having 1 to 5 carbon atoms, or an alkoxy group having 1 to 5 carbon atoms).

3 Claims, 1 Drawing Sheet

BENZIMIDAZOLONE COMPOUND

TECHNICAL FIELD

The present invention relates to a benzimidazolone compound usable as a violet pigment.

BACKGROUND ART

A dioxazine type pigment (C. I. Pigment Violet 23) has been conventionally known as a typical violet pigment. The dioxazine pigment has a vivid violet hue, but there is a problem in that the pigment has poor solvent resistance (for example, please refer to Non-patent document 1). Furthermore, when it is used in a paint as a violet pigment, there are problems in that the paint has high thixotropy and poor storage stability.

Non-patent document 1: H. Gaertner, J. Oil & Color Chemists Assoc. 46, 13 (1963)

DISCLOSURE OF INVENTION

Problem to be Solved by the Invention

The purpose of the present invention is to provide a benzimidazolone compound which has a vivid violet hue and is usable as a violet pigment excellent in solvent resistance, and when it is used in a paint as a violet pigment, the paint can have low thixotropy and excellent storage stability.

Means for Solving the Problem

The inventors of the present invention have made efforts and studied in order to solve the above problems, and as a result, they found that a benzimidazolone compound wherein a benzimidazolone skeleton structure is introduced to an anthraquinone structure can be used as a violet pigment and it can have a vivid violet hue. They also found that said compound was excellent in solvent resistance and, when the pigment was used in a paint, the paint showed low thixotropy and excellent storage stability.

That is, the present invention provides a benzimidazolone compound represented by the following general formula (1).

EFFECT OF THE INVENTION

The benzimidazolone compound of the present invention has a vivid violet hue, and therefore it can be used as a violet pigment. Moreover, this compound is excellent in solvent resistance, and furthermore, when it is used for a paint material as a violet pigment, low thixotropy and excellent storage stability of the paint can be achieved.

BEST MODE FOR CARRYING OUT THE INVENTION

Figure 1:
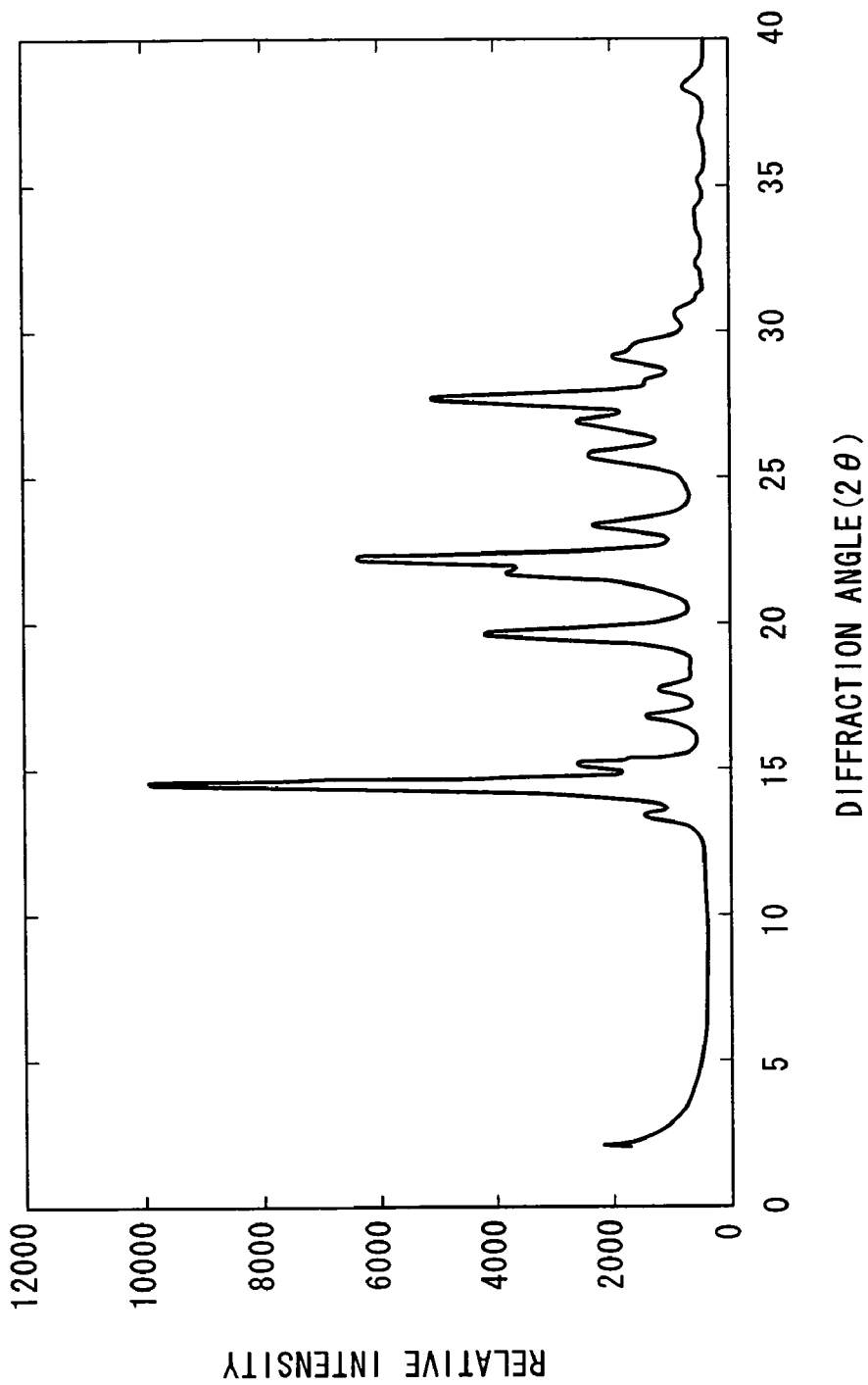
FIG. 1 is an X-ray diffraction spectrum of a compound (5) of the present invention prepared in Example 1 wherein a Cu—Kα characteristic X ray is used.

Synthetic examples of the benzimidazolone compound represented by the general formula (1) of the present invention are described below.

(Synthetic Method 1)

Among the compounds represented by the general formula (1), a benzimidazolone compound wherein $R^1$ and $R^4$ are the same groups as each other and $R^2$ and $R^3$ are the same groups as each other can be obtained by the following method for example. That is, one equivalent of a compound represented by a following formula (2) (hereinafter, referred as to compound (2)), one equivalent of a compound represented by general formula (3) (hereinafter, referred as to compound (3)), and one equivalent of a compound represented by general formula (4) (hereinafter, referred as to compound (4)) are reacted with each other at a temperature of 150 to 200° C. for 8 to 25 hours in an aprotic polar solvent, such as 1,3-dimethyl-2-imidazolidinone, dimethyl sulfoxide, N, N-dimethyl formamide and N-methyl-2-pyrrolidone. In order to remove hydrochloric acid generated in the reaction, sodium acetate, calcium acetate, potassium acetate, and the like may exist in the reaction liquid while the reaction is conducted. After the reaction is completed, the obtained reaction liquid is cooled to room temperature to deposit crystals, and then, the obtained crystals are treated by filtration, washing, drying, and pulverization using standard methods to obtain a target compound.

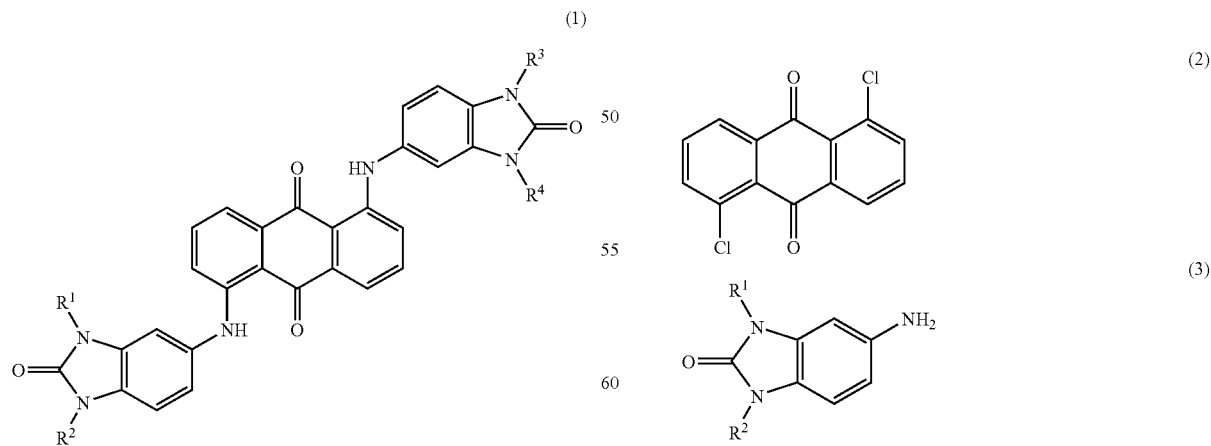

(In the formula, $R^1$, $R^2$, $R^3$, and $R^4$ each independently represents a hydrogen atom, an alkyl group having 1 to 5 carbon atoms, or an alkoxy group having 1 to 5 carbon atoms.)

(In the general formulae, $R^1$ and $R^2$ each independently represents a hydrogen atom, an alkyl group having 1 to 5 carbon atoms, or an alkoxyl group having 1 to 5 carbon atoms.)

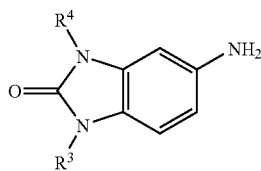

(In the general formulae, $R^3$ and $R^4$ each independently represents a hydrogen atom, an alkyl group having 1 to 5 carbon atoms, or an alkoxyl group having 1 to 5 carbon atoms.)

(Synthetic Method 2)

Among the compounds represented by the general formula (1), a benzimidazolone compound, wherein $R^1$ and $R^4$ are different to each other or $R_2$ and $R_3$ are different to each other, can be obtained by a two-step reaction under reaction conditions similar to those of the synthetic method 1. That is, in the first step, one equivalent of the compound (2) and one equivalent of the compound (3) are reacted with each other, and then in the second step, one equivalent of the compound (4) is reacted with a reaction product obtained in the first step reaction. After the obtained reaction liquid is cooled to room temperature to deposit crystals, the crystals are treated by filtration, washing, drying, and pulverization using the standard methods to obtain a target compound.

Among the compounds represented by the general formula (1), a compound represented by the following formula (5) wherein all of $R^1$, $R^2$, $R^3$ and $R^4$ represent a hydrogen (hereinafter, referred as to compound (5)) is preferable, since the compound (5) can be obtained as crystals which show a particularly vivid violet hue.

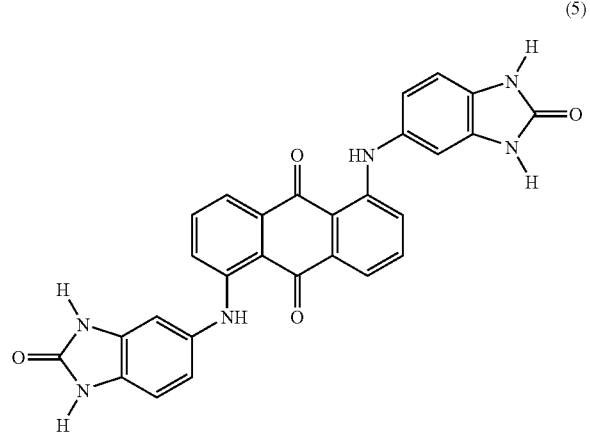

The violet crystals obtained as the compound (5) are crystals wherein a Bragg angle 2θ thereof in a X-ray diffraction spectrum using a Cu—Kα characteristic X ray have diffraction peaks at 14.5±0.2°, 19.7±0.2°, 22.2±0.2°, and 27.7±0.2°.

Since the crystals of the compound (5) obtained by the aforementioned production method have a violet hue, they can be used as a pigment as they are, and may be used together with other colorant(s) to produce a coloring composition. Moreover, for the purpose of improving tinting strength, weather resistance and transparency, after-treatment can be conducted to adjust the size of the crystals of the pigment.

When it is desired to grow the crystals of the pigment into larger size, for example, a method can be used wherein a compound (5) is heat-treated in an organic solvent, water, or a mixed solvent thereof under ordinary pressure or pressurized conditions. Examples of the aforementioned organic solvent include: aprotic polar solvents, such as dimethyl sulfoxide, N-methyl-2-pyrrolidone, N, N-dimethylformamide; ether solvents such as ethylene glycol monomethyl ether, and monoethyl ether; alcohol solvents such as methanol, butanol, and isobutanol; ketone solvents such as acetone, methyl ethyl ketone, and cyclohexanone; pyridine solvents such as pyridine, picoline, and quinoline; and aromatic solvents such as benzene, xylene, and toluene. Moreover, these organic solvents may be used singly or in combination of two or more.

When the crystals of the pigment are pulverized, it is possible to use a grinding method wherein grinding-equipment such as a kneader, a ball mill, an attriter, and the like is used for example. In the grinding process of the method, a liquid grinding aid such as a diethylene glycol and/or a grinding medium such as sodium chloride can be used as required.

EXAMPLES

Hereinafter, the present invention is explained by using Examples. Furthermore, "part" and "%" means mass basis in so far as there is no specific mention.

Example 1

44.7 parts of 5-amino benzimidazolone, 33 parts of 1,5-dichloro anthraquinone, and 21.5 parts of sodium acetate were added to 500 parts of 1,3-dimethyl-2-imidazolidinone, and the mixture was stirred at 175° C. for 25 hours. After cooling the mixture to room temperature, the deposited material was filtrated and washed with 200 parts of 1,3-dimethyl-2-imidazolidinone and with 600 parts of acetone, and then it was dried under reduced pressure at 110° C. for 8 hours to obtain 32.6 parts of violet crystals (yields: 54%).

Infrared spectral analysis and FD-MS analysis were conducted on the obtained violet crystals, and the following results were obtained.

(Infrared Spectral Analysis)
3400 cm$^{-1}$: N—H stretching vibration of aromatic amine
3200 cm$^{-1}$: N—H stretching vibration of an imidazolone ring
1700 cm$^{-1}$: C═O stretching vibration of aromatic ketone (FD-MS)
A molecule ion peak (M+) of a molecule having a molecular weight of 502 was detected as a result of mass analysis.

From the analysis results, it was confirmed that the obtained violet crystals were the compound (5) represented by the formula (5).

Furthermore, a powder X-ray diffraction analysis wherein a Cu—Kα ray exposure was used was conducted on the obtained violet crystals with X-ray diffraction equipment "RINT ULTIMA+" manufactured by Rigaku Corporation under the following conditions.

Working electric power: 40 kV, 30 mA
Sampling angle: 0.020°
Emission and scattering slit: (½)
Luminescence slit: 0.3 mm
Scanning speed: 2°/minute An X-ray diffraction spectrum is shown in FIG. 1. Regarding the violet crystals made of the compound (5), a Bragg angle 2θ thereof in the X-ray diffraction spectrum using a Cu—Kα characteristic X ray has diffraction peaks at 14.5±0.2°, 19.7±0.2°, 22.2±0.2°, and 27.7±0.2°.

(Preparation of Paint for Evaluation)
66 parts of a mixed resin obtained by mixing 70% of an alkyd resin for baking paint ("BECKOSOL J-524-IM-60"

manufactured by Dainippon Ink and Chemicals, Incorporated, trade name) and 30% of a melamine resin ("SUPER BECKAMINE G-821-60" manufactured by Dainippon Ink and Chemicals, Incorporated, trade name) was dissolved in 12 parts of a mixed solvent (xylen:butanol=7:3) to obtain a resin composition.

A mixture obtained by mixing 78 parts of the aforementioned resin composition and 2 parts of the aforementioned compound (5) was dispersed for two hours with a paint conditioner (manufactured by Toyo Seiki Seisaku-Sho, Ltd., glass beads having a diameter of 3.0 mm are used therein) to obtain a pigment dispersion liquid. 18 parts of a resin solution obtained by mixing a mixed resin and a mixed solvent (mixed resin:mixed solvent=4:3, said mixed resin and mixed solvent were prepared similar to those used for preparing the aforementioned resin composition) was added to 12 parts of said pigment dispersion liquid to dilute, and a paint for evaluation was obtained.

(Preparation of Coating Film for Evaluation)

The paint for evaluation obtained as described above was applied on the surface of art paper with an applicator, and it was baked for 30 minutes at 130° C. to obtain a coating film. The obtained coating film had a glossy violet hue.

(Colorimetry of Coating Film for Evaluation)

The colorimetry of the coating film for evaluation obtained above was carried out with a color-difference meter ("SZ-Σ 90" manufactured by Nippon Denshoku, Inc., C/2 light source is used) to obtain chromaticity (L*, a*, b*).

Flow rate of a flow-through gas: 200 ml/minute
Measurement container: Platinum pan (Thixotropy Test)

Steady flow viscosity measurement of a paint for evaluation, which was obtained immediately after the preparation thereof, was conducted under the following conditions with viscoelasticity measurement equipment ("RHEOSTRESS RS150", manufactured by HAAKE corporation). Values (TI value; thixotropic index) were calculated by dividing viscosity at shear rate of 5 s$^{-1}$ by the viscosity at shear rate of 50 s$^{-1}$, wherein each viscosity was obtained by measurement.

Cone plate size: 60 mm
Cone plate angle: 2°
Preliminary shear: shear rate 10 s$^{-1}$, 60 seconds
Stationary period before measurement: 60 seconds
Measurement range of shear rate: 1 to 100 s$^{-1}$ (Storage Stability Test (Average Particle Diameter))

Each volume average particle diameter of a paint for evaluation obtained immediately after the preparation and a paint for evaluation which was allowed to stand for four days after the preparation was measured with particle size distribution measurement equipment ("MICROTRAC UPA150" manufactured by Nikkiso Co., Ltd.). Using the volume average particle diameter obtained by the measurement, the rate of change of the average particle diameter was calculated using the following expression.

$$\text{Rate of change (\%)} = \frac{\text{Average particle diameter after four days } (\mu m) - \text{Average particle diameter immediately after the preparation } (\mu m)}{\text{Average particle diameter immediately after the preparation } (\mu m)} \times 100$$

(Solvent Resistance Test)

0.5 parts of the compound (5) were added to 10 ml of ethanol, toluene, or ethyl acetate, and after carrying out ultrasonic distribution for 30 minutes, it was filtered with a syringe filter having 0.45 μm openings. The solvent resistance of the compound regarding each solvent was determined based on the result of whether or not the filtrate was colored.

(Storage Stability Test (Viscosity))

Measurement of viscosity of a paint for evaluation which was allowed to stand after the preparation for one week was conducted as well as the aforementioned thixotropy test. Regarding each of the viscosity at the shear rate of 5 s$^{-1}$ and the viscosity at the shear rate of 50 s$^{-1}$, the rate of change of the viscosity was calculated using the following expression.

$$\text{Rate of change (\%)} = \frac{\text{Viscosity of a paint one week after the preparation for } (mPa \cdot s) - \text{Viscosity of a paint immediately after the preparation } (mPa \cdot s)}{\text{Viscosity of a paint immediately after the preparation } (mPa \cdot s)} \times 100$$

(Measurement of Decomposition Temperature)

Regarding the compound (5), a thermal analysis was conducted under the following conditions with differential-thermal-analysis equipment ("TG 8101D", manufactured by Rigaku corporation) to determine a decomposition temperature.

Range of measured temperature: 30 to 800° C.
Programming rate: 10° C./minute
Flow-through gas: Nitrogen Comparative Example 1

Using a dioxazine type pigment ("FASTOGEN SUPER VIOLET RVS", manufactured by Dainippon Ink and Chemicals, Incorporated, trade name, C.I. Pigment Violet 23,) instead of the compound (5), evaluations were conducted similar to the aforementioned evaluations for the compound (5). The evaluation results of Example 1 and Comparative Example 1 are shown in Table 1.

TABLE 1

|  |  |  | Example 1 | Comparative Example 1 |
|---|---|---|---|---|
| Compound |  |  | Compound (5) | Dioxazine type pigment |
| Hue |  |  | Violet | Violet |
| Chromaticity of a coating film |  | L* | 34.06 | 34.70 |
|  |  | a* | 7.96 | 10.53 |
|  |  | b* | −8.77 | −14.92 |
| Solvent | Ethanol |  | Insoluble | Insoluble |
| resistance | Toluene |  | Insoluble | Slightly soluble |
|  | Ethyl acetate |  | Insoluble | Slightly soluble |
|  | Decomposition temperature (° C.) |  | 504 | 428 |
| Thixo- | Viscosity immediately after the | Shear rate at 5 s$^{-1}$ | 239 | 572 |
| tropy | preparation (mPa · s) | Shear rate at 50 s$^{-1}$ | 217 | 334 |
|  | TI value immediately after the preparation |  | 1.10 | 1.71 |
| Storage | Average particle diameter immediately after |  | 0.35 | 0.86 |
| stability | the preparation (μm) |  |  |  |
| (average | Average particle diameter four days after |  | 0.36 | 1.08 |
| particle | the preparation (μm) |  |  |  |
| diameter) | Rate of change of average partice diameter (%) |  | 2.9 | 25.6 |
| Storage | Viscosity one week | Shear rate at 5 s$^{-1}$ | 242 | 785 |
| stability | after the preparation | Rate of change of viscosity | 1.3 | 37.2 |
| (viscosity) | (mPa · s) | (%) |  |  |
|  |  | Shear rate at 50 s$^{-1}$ | 225 | 419 |
|  |  | Rate of change of viscosity | 3.7 | 25.4 |
|  |  | (%) |  |  |

From the evaluation results of Table 1, the following were verified.

(Solvent Resistance)

The benzimidazolone compound of the present invention was insoluble in toluene and ethyl acetate. On the other hand, the dioxazine type pigment was slightly soluble in toluene and ethyl acetate. Accordingly, it can be confirmed that the benzimidazolone compound of the present invention has excellent solvent resistance as compared with the dioxazine type pigment.

(Decomposition Temperature)

The benzimidazolone compound of the present invention showed a high decomposition temperature of 504° C. Accordingly, it can be confirmed that the benzimidazolone compound is stable even at a high temperature.

(Thixotropy)

The paint including the benzimidazolone compound of the present invention has a TI value of 1.10, and showed newtonian viscosity. On the other hand, the paint including the dioxazine type pigment has a TI value of 1.71, and does not show newtonian viscosity. Accordingly, it can be confirmed that the paint including the benzimidazolone compound of the present invention has excellent characteristics such that the viscosity does not vary even if coating is conducted under any conditions.

(Storage Stability)

The paint including the benzimidazolone compound of the present invention caused little change of the viscosity of the paint and the average particle diameter of the benzimidazolone compound with the passage of time. On the other hand, the paint including the dioxazine type pigment caused an increase of the average particle diameter of the dioxazine type pigment with the passage of time, and the viscosity of the paint also increased with the passage of time. Accordingly, it can be confirmed that the paint including the benzimidazolone compound of the present invention is superior to the paint including the dioxazine type pigment with respect to storage stability.

INDUSTRIAL APPLICABILITY

The benzimidazolone compound of the present invention can be used as a violet pigment and is excellent in solvent resistance. Furthermore, when the benzimidazolone compound is used for a paint, it is possible to obtain a paint wherein it is excellent in storage stability and has low thixotropy, and therefore, the compound can be used in a large variety of fields such as a printing ink, a coating material, a colored plastic, a toner, an ink used for an ink-jet printing, a color filter and the like.

The invention claimed is:

1. A benzimidazolone compound represented by a general formula (1),

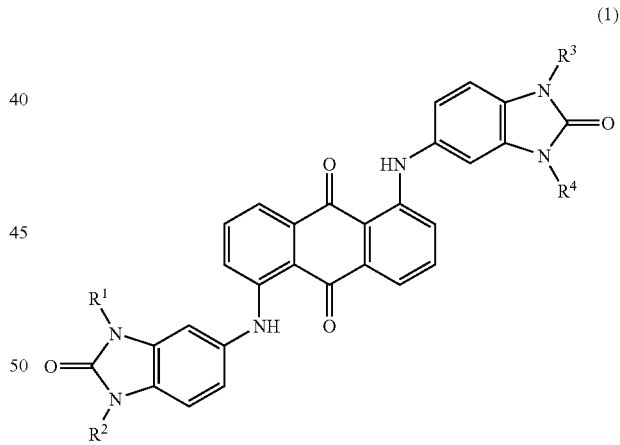

(1)

(in the formula, $R^1$, $R^2$, $R^3$ and $R^4$ each independently represents a hydrogen atom, an alkyl group having 1 to 5 carbon atoms, or an alkoxy group having 1 to 5 carbon atoms).

2. The benzimidazolone compound according to claim 1, wherein all of $R^1$, $R^2$, $R^3$, and $R^4$ of a general formula (1) represent a hydrogen atom.

3. The benzimidazolone compound according to claim 2, wherein the Bragg angle 2θ of the benzimidazolone compound in an X-ray diffraction spectrum using a Cu—Kα characteristic X ray has diffraction peaks at 14.5±0.2°, 19.7±0.2°, 22.2±0.2°, and 27.7±0.2°.

* * * * *